United States Patent [19]

Steppat et al.

[11] Patent Number: 4,947,805
[45] Date of Patent: Aug. 14, 1990

[54] COOLABLE PLUNGER PISTON FOR INTERNAL COMBUSTION ENGINES

[75] Inventors: Eduard Steppat, Kirchheim/Teck; Thomas Letsch, Plüderhausen, both of Fed. Rep. of Germany

[73] Assignee: Mahle GmbH, Stuttgart, Fed. Rep. of Germany

[21] Appl. No.: 411,483

[22] PCT Filed: May 21, 1988

[86] PCT No.: PCT/EP88/00455
§ 371 Date: Sep. 22, 1989
§ 102(e) Date: Sep. 22, 1989

[87] PCT Pub. No.: WO88/09433
PCT Pub. Date: Dec. 1, 1988

[30] Foreign Application Priority Data

May 26, 1987 [DE] Fed. Rep. of Germany ....... 3717767

[51] Int. Cl.⁵ .............................................. F01P 1/04
[52] U.S. Cl. ................................ 123/41.35; 92/159; 92/186
[58] Field of Search .......... 123/41.35, 193 P, 193 CP; 92/158, 159, 186, 216, 219

[56] References Cited

U.S. PATENT DOCUMENTS

| 4,056,044 | 11/1977 | Kamman et al. | 92/159 |
| 4,129,108 | 12/1978 | Elsbett et al. | 123/41.35 |
| 4,377,967 | 3/1983 | Pelizzoni | 92/186 |
| 4,577,595 | 3/1986 | Deutschmann et al. | 123/41.35 |
| 4,593,660 | 10/1986 | Elsbett et al. | 92/159 |

FOREIGN PATENT DOCUMENTS 3425228 2/1986 Fed. Rep. of Germany .

Primary Examiner—Noah P. Kamen
Attorney, Agent, or Firm—Collard, Roe & Galgano

[57] ABSTRACT

In a piston whose rod 2 is connected in a hinged manner to the upper part of the piston through the piston axis and whose upper part, inside an annular support 5 in the central region of the base of the piston, is to be cooled by the cooling oil injected from the crankshaft chamber, the problem which arises is to introduce the cooling oil into this region without touching the annular support 5. In order to resolve this problem, a deflecting surface for the cooling oil in the shape of a channel section 11 is arranged at the upper end of the rod 2. This channel section 11 guides the injected cooling oil through a radial orifice 10 in the wall of the annular support 5 inside the central cooling chamber 9 below the base 4 of the piston. To improve the cooling effect of the cooling oil in the inner central chamber 9, the latter may be isolated from the crankshaft chamber by a cover 12.

3 Claims, 1 Drawing Sheet

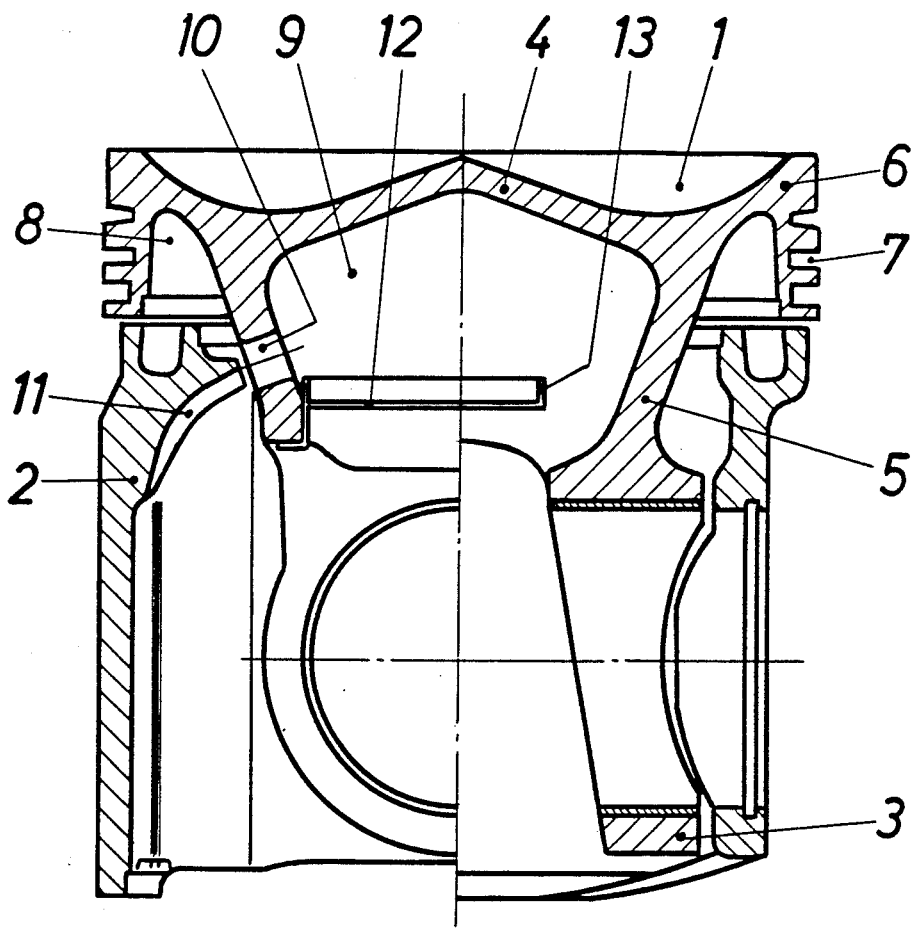

COOLABLE PLUNGER PISTON FOR INTERNAL COMBUSTION ENGINES

BACKGROUND OF THE INVENTION

1. Field of the Invention.

The invention relates to a coolable plunger piston for internal combustion engines.

2. The Prior Art.

This type of piston is known, for example, in the art based on U.S. Pat. No. 4,180,027. The aforementioned piston is cooled in the area of the piston head, both in the outer annulus, as well as in the radial, central internal area. Cooling oil is injected from the crankcase into the outer annulus in the upper portion of the piston. By means of liquid collection traps located at the upper end of the piston shaft, the cooling oil is able to penetrate the area inside the inner annular side support.

GB-A 2,148,451 discloses a similar piston. Here, too, the cooling oil intended for the area inside the inner annular side support can only be delivered via an external closed cooling conduit. Cooling oil which has been injected into the outer cooling conduit reaches, respectively, the center of the piston head via at least one radial aperture in the inner annular side support, by means of the mass forces operative during the oscillating movement of the piston on the cooling oil present in the cooling conduit. Direct spurting from the crankcase is impossible during the process, with the result that only cooling oil already previously warmed is able to access the center of the piston head.

SUMMARY OF THE INVENTION

An object of the present invention is to create a more effective and, in construction, a more straight-forward manner of delivering cooling oil to the central internal area of the piston by means of direct injection from the crankcase.

The above object is accomplished in accordance with the present invention by providing a coolable plunger piston for an internal combustion engine comprising an upper portion having a piston head, said piston head having externally radially an annular side section, said annular side section having annular piston grooves, along with an inner annular side support which extends at a distance into said piston head within the external annular side section, a piston shaft having an interior area and being connected only to said upper portion and at least one radial aperture leading directly into the interior area of the piston shaft which is open toward the end of the piston shaft, and said radial aperture being located in the inner annular side support, said piston shaft having an inner surface, and a channel section on the inner surface of the piston shaft, said channel section extending to the piston axis, said channel section provided with an opening in the direction of the piston axis, and being curved in the longitudinal direction of the piston, said channel section having an end leading to the piston head and discharging into said at least one radial aperture of the inner annular side support, said channel section extending in a curved fashion in a radial plane stretching through the piston axis in such a way that the cooling oil, injected in the form of a jet, after an approximately tangential intake into the one end of the channel section which originates on the inner surface of the piston shaft, strikes the radial aperture of the annular side support in an approximately vertical fashion, and wherein said piston head is coolable at least in the section lying inside the inner annular side support by means of oil injected from a crankcase into the piston.

BRIEF DESCRIPTION OF THE DRAWINGS

Other objects and features of the present invention will become apparent from the following detailed description considered in connection with the accompanying drawing which discloses one embodiment of the present invention. It should be understood, however, that the drawing is designed for the purpose of illustration only, and not as a definition of the limits of the invention.

In the drawing, the FIGURE shows a piston in two semi-cross sections, offset by 90° with respect to each other.

DETAILED DESCRIPTION OF THE PREFERRED EMBODIMENT

Turning now, in detail, to the drawings, the piston includes a piston upper portion 1 and a shaft 2 whereby these parts are interconnected by a piston gudgeon pin which is not shown. The gudgeon pin is positioned in bores of the hubs 3 in the upper portion of the piston 1. The hubs 3 are connected by an inner annular side support 5 to the piston head 4. Radially and externally, the piston head 4 evolves into an outer external annular side section 6 which receives the annular grooves 7.

Cooling oil is injected, in a manner not shown, from the crankcase into the outer annulus 8. In order to also deliver cooling oil into the inner area 9 inside the inner annular side support 5, a radial aperture 10 has been provided in the inner annular side support. A channel section 11 open in the direction of the piston axis is formed from the inner surface of the piston shaft 2. The direction of flow in this channel lies in a radial plane stretching through the piston axis and is curved in such a way that the end of the channel section leading to the piston head directly discharges into the aperture 10. The curvature of the flow channel in the channel section 11 is such that oil injected from the crank-case by a jet in the form of a jet of oil discharges approximately tangentially into the channel section 11. The diameter of the channel is moreover such that it is somewhat smaller than the aperture cross-section of the radial aperture 10. In this way the integral transmission of the cooling oil out of the channel into the aperture 10 is assured.

To permit injection of the cooling oil delivered to the inner area 9, the inner area 9 is sealed at its end which is open by a cover plate applied, for example, by means of screws or through welding. Care has, to be sure, been taken during the welding to retain openings, or free spaces, to drain off the cooling oil.

Where the cover plate 12 constitutes a bridge-like form which only partially encompasses the lower aperture of the inner area 9, then the edges not directly abutting the inner annular side support can be configured as collars.

While only a single embodiment of the present invention has been shown and described, it is to be understood that many changes and modifications may be made thereunto without departing from the spirit and scope of the invention as defined in the appended claims.

We claim:

1. A coolable plunger piston for an internal combustion engine comprising:

an upper portion having a piston head;
said piston head having externally radially an annular side section;
said annular side section having annular piston grooves;
an inner annular side support which extends at a distance into said piston head within the external annular side section;
a piston shaft having an interior area and being connected only to said upper portion;
at least one radial aperture leading directly into the interior are of the piston shaft which is open toward the end of the piston shaft, and said radial aperture being located in the inner annular side support;
said piston shaft having an inner surface;
a channel section on the inner surface of the piston shaft, said channel section extending to the piston axis, said channel section provided with an opening in the direction of the piston axis, and being curved in the longitudinal direction of the piston;
said channel section having an end leading to the piston head and discharging into said at least one radial aperture of the inner annular side support;
said channel section extending in a curved fashion in a radial plane stretching through the piston axis in such a way that the cooling oil, injected in the form of a jet, after an approximately tangential intake into the one end of the channel section which originates on the inner surface of the piston shaft, strikes the radial aperture of the annular side support in an approximately vertical fashion; and
wherein said piston head is coolable at least in the section lying inside the inner annular side support by means of oil injected from a crankcase into the piston.

2. A coolable plunger piston according to claim 1, wherein the channel cross-section of the channel section is smaller than the cross-section of the at least one radial aperture.

3. A coolable plunger piston according to claim 1, further comprising:
   a drainage orifice;
   a cover plate which is solidly interlockable with said inner annular side support; and
   the lower open end of the inner area inside the inner annular side support capable of being sealed off except for said drainage orifice enabling the cooling oil to be drained off by means of said cover plate.

* * * * *